(12) United States Patent
Cao et al.

(10) Patent No.: US 8,446,842 B2
(45) Date of Patent: May 21, 2013

(54) METHOD AND APPARATUS FOR IDENTIFYING SIMILAR SUB-GRAPHS IN A NETWORK

(75) Inventors: Nan Cao, Beijing (CN); Shixia Liu, Beijing (CN); Wei Hong Qian, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 208 days.

(21) Appl. No.: 12/548,513

(22) Filed: Aug. 27, 2009

(65) Prior Publication Data

US 2010/0063973 A1 Mar. 11, 2010

(30) Foreign Application Priority Data

Aug. 27, 2008 (CN) .......................... 2008 1 0212645

(51) Int. Cl.
*H04L 12/28* (2006.01)
(52) U.S. Cl.
USPC ......................................................... 370/254
(58) Field of Classification Search
USPC .................................................. 707/758, 803
See application file for complete search history.

(56) References Cited

U.S. PATENT DOCUMENTS

| | | | | |
|---|---|---|---|---|
| 8,041,729 | B2 * | 10/2011 | Vandelle et al. | 707/767 |
| 2004/0015905 | A1 * | 1/2004 | Huima | 717/141 |
| 2006/0036564 | A1 * | 2/2006 | Yan et al. | 707/1 |
| 2009/0204582 | A1 * | 8/2009 | Grandhi et al. | 707/3 |
| 2009/0262664 | A1 * | 10/2009 | Leighton et al. | 370/254 |
| 2010/0063973 | A1 * | 3/2010 | Cao et al. | 707/758 |
| 2010/0274804 | A1 * | 10/2010 | Muskal et al. | 707/769 |

OTHER PUBLICATIONS http://www.sbg.bio.ic.ac.uk/~phunkee/html/network_context.html Phunkee—Pairing subgrapHs Using NetworK Environment Equivalence.
—http://arxiv.org/pdf/q-bio.MN/0401029.pdf, Toy Models and Statistical Mechanics of Subgraphs and Motifs of Genetic and Protein Networks.
—http://www.dpi.inpe.br/~mpss/artigos/ImageMining2004.pdf, Remote Sensing Image Mining Using Ontologies, Marcelino Pereira dos Santos Silva and Gilberto Câmara.
C. Alippi, et al., "Behavioral Testability and Test Pattern Generation of the Hopfield Network Model", IEEE, 1994, pp. 4571-4576.

* cited by examiner

*Primary Examiner* — Don Wong
*Assistant Examiner* — Mohammad Kabir
(74) *Attorney, Agent, or Firm* — Scully, Scott, Murphy & Presser, P.C.; Eustus D. Nelson, Esq.

(57) ABSTRACT

A method and an apparatus for identifying sub-graphs similar to a sample sub-graph from a network, in particular for identifying similar community structures from a network, are disclosed. Specifically, when a sample sub-graph is a community structure, it usually contains a plurality of nodes densely associated with each other. The method proposes first screening the network via key nodes of community structures so as to find sub-graph candidates that are potentially similar to the sample sub-graph, then strictly comparing the sub-graph candidates with the sample sub-graph to find similar sub-graphs of the sample sub-graph.

20 Claims, 9 Drawing Sheets

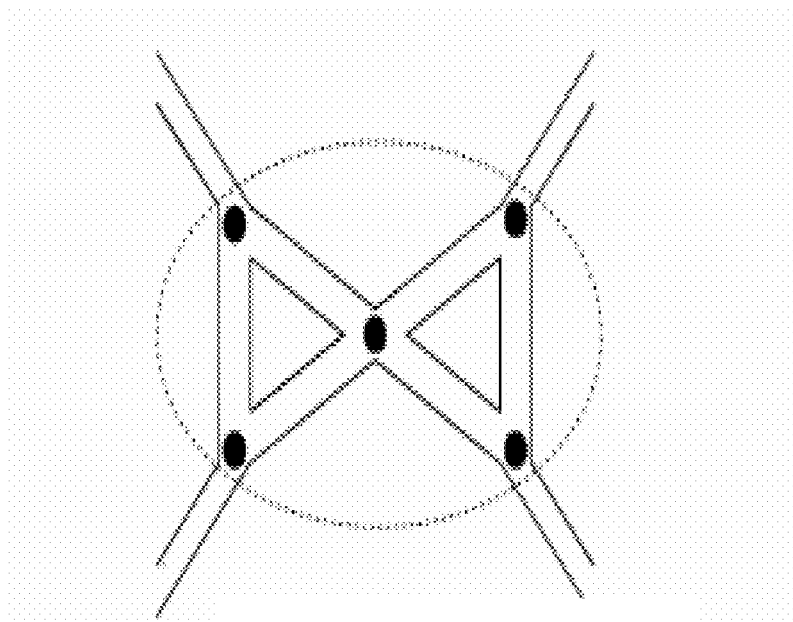
Figure 1 (a) (Prior Art)
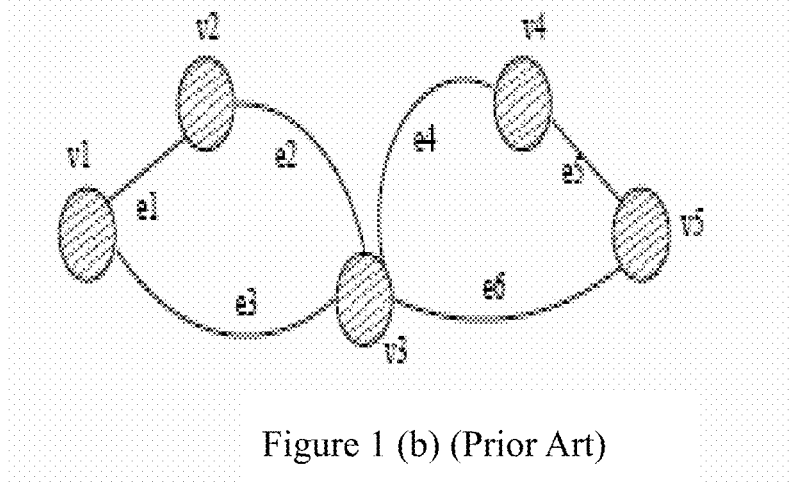
Figure 1 (b) (Prior Art)

METHOD AND APPARATUS FOR IDENTIFYING SIMILAR SUB-GRAPHS IN A NETWORK

CROSS REFERENCE TO RELATED APPLICATIONS

This application claims priority under 35 U.S.C. §119 from Chinese Patent Application number 200810212645.6, filed on Aug. 27, 2008, the entire contents of which are herein incorporated by reference.

BACKGROUND OF THE INVENTION

Many modern applications handle objects that can be represented as graphs. Transportation applications need to manipulate road networks, CAD/CAM applications require the organization of electrical or electronic components, pattern recognition and computer vision applications require the classification of an unknown object, chemistry and molecular biology applications require the manipulation of molecules. In the aforementioned applications, as well as in much more, the objects are structural in nature and therefore can be considered as graphs. For example, a graph G (V, E) is composed of a set of nodes V and a set of edges E, with each edge connecting two nodes. FIG. 1(b) illustrates a simple example of network graph found in prior art. In many areas, there are multiple objects involved and the relations between objects may be quite complex, where the objects are represented by large and complex network graphs. In order to better understand several aspects of the invention, some frequently used technical terms in this field are introduced as follows.

In prior art, a number of graph classes have been identified, including simple graphs, pseudo-graphs (with loops), multi-graphs (two or more edges connecting a pair of nodes), directed graphs (the edges have an orientation), weighted graphs (there is a weight associated with each edge). The similarity between graphs is measured in terms of the distance between graphs. The closer two graphs are, the more similar they are. If the distance between two graphs is 0, they can be considered as identical. There are usually two manners of measuring the distance between graphs:

Feature-based Distance: a set of features is extracted from the structural representation, and these features are used as n-d vector where the Euclidean distance can be applied.

Cost-based Distance: the distance between two objects measures the number of modification (edition) required in order to transform the first object to the second.

In the prior art, there are a number of methods being proposed to calculate the similarity between graphs using one of the above manners. For example, Structure-Based Similarity Search with Graph Histograms, 10th International Workshop on Database & Expert Systems Applications, pp. 174-178, Sep. 1-3, 1999, by Apostolos N. Papadopoulos, Yannis Manolopoulos, proposes to calculate similarity based on a cost function. Moreover, please refer to, Rascal: Calculation of Graph Similarity Using Maximum Common Edge Sub-graphs, The Computer Journal, vol. 45, no. 6, pp. 631-644, 2002, by J. Raymond, E. Gardiner, and P. Willett; A Distance Measure between Attributed Relational Graphs for Pattern Recognition, IEEE Transactions on Systems, Man and Cybernetics, vol. 13, pp. 353-362, 1983, by A. sanfeliu K.-S.Fu. The contents of the above papers are incorporated entirely herein by reference.

One frequently asked question in network graph applications is how to detect a community structure in a huge and complex network graph. The community structures are subsets of nodes within which node-node connections are dense, but between which connections are less dense. FIG. 2 shows an exemplary network graph, found in prior art, having a number of communities. For the sake of simplicity and clarity, the network of FIG. 2 is relatively simple, with only 3 communities. The connections within each community are relatively dense, while the connections between communities are relatively loose. The heterogeneity of connections suggests that the network has certain natural divisions within it. Community structures are quite common in real networks. Social networks often include community groups based on common location, interests, occupation, etc. Metabolic networks have communities based on functional groupings. Being able to identify these sub-structures within a network can provide insight into how network function and topology affect each other.

Finding communities within an arbitrary network can be a difficult task. The number of communities, if any, within the network is typically unknown and the communities are often of unequal size and/or density. Despite these difficulties, however, several methods for community finding have been developed and employed. One of the oldest algorithms for dividing networks into parts is the minimum-cut method (and variants such as ratio cut and normalized cut). This method sees use, for example, in load balancing for parallel computing in order to minimize communication between processor nodes. In the minimum-cut method, the network is divided into a predetermined number of parts, usually of approximately the same size, chosen such that the number of edges between groups is minimized. The method works well in many of the applications for which it was originally intended but is less than ideal for finding community structure in general networks since it will find communities regardless of whether they are implicit in the structure, and it will find only a fixed number of them. In addition, one of the most widely used methods for community detection is modularity maximization. Modularity is a benefit function that measures the quality of a particular division of a network into communities. The modularity maximization method detects communities by searching over possible divisions of a network for one or more that have particularly high modularity. Since exhaustive search over all possible divisions is usually intractable, practical algorithms are based on approximate optimization methods such as greedy algorithms, simulated annealing, or spectral optimization, with different approaches offering different balances between speed and accuracy.

However, the calculation complexity required for applying the above methods to a huge and complex network graph is tremendous, which is often of O(n3) complexity. Therefore, it is difficult to find similar sub-graphs (e.g., community structures) from a huge network.

SUMMARY OF THE INVENTION

Aspects of the invention are directed to a method and an apparatus for identifying sub-graphs similar to a sample sub-graph from a huge network, in particular for identifying similar community structures from a huge network. Specifically, when a sample sub-graph is a community structure, it usually contains a plurality of nodes densely associated with each other. Thus, it is possible to first screen the network via key nodes of community structures so as to find sub-graph candidates that are potentially similar to the sample sub-graph, then strictly compare every sub-graph candidate with the sample sub-graph to find similar sub-graphs of the sample sub-graph.

In one aspect of the invention, a method of identifying a sub-graph candidate potentially similar to a sample sub-graph from a network is disclosed. The method includes identifying one or more sample key nodes of the sample sub-graph. The method includes selecting key nodes similar to the sample key nodes of the sample sub-graph from the network. The method further includes grouping the selected similar key nodes and expanding at least one group of similar key nodes into a corresponding sub-graph candidate.

In another aspect of the invention a method of identifying a sub-graph similar to a sample sub-graph from a network is disclosed. The method includes identifying one or more sample key nodes of the sample sub-graph and selecting key nodes similar to the sample key nodes of the sample sub-graph from the network. The method further includes grouping the selected similar key nodes and expanding at least one group of similar key nodes into a corresponding sub-graph candidate. The method also includes comparing each sub-graph candidate with the sample sub-graph to identify a similar sub-graph of the sample sub-graph.

In yet another aspect of the invention an apparatus for identifying a sub-graph similar to a sample sub-graph from a network is disclosed. The apparatus includes a sample key node extracting unit for extracting one or more sample key nodes of the sample sub-graph and a similar key node extracting unit for extracting key nodes similar to the sample key nodes of the sample sub-graph from the network. The apparatus also includes a key node grouping unit for grouping the selected similar key nodes and an expanding unit for expanding at least one group of similar key nodes into a corresponding sub-graph candidate. The apparatus also includes a comparing unit for comparing each sub-graph candidate with the sample sub-graph to identify a similar sub-graph of the sample sub-graph.

BRIEF DESCRIPTION OF THE DRAWINGS

Some of the embodiments of the present invention are described in detail below, by way of example only, with reference to the following drawings, where FIG. 1(a) shows an exemplary road network, commonly found in prior art.

FIG. 1(b) shows an exemplary graph representation of the road network of FIG. 1(a), according to a currently existing way found in prior art.

DETAILED DESCRIPTION OF EXEMPLARY EMBODIMENTS OF THE INVENTION

Some of the embodiments of the invention propose a method and a system for identifying sub-graphs similar to a sample sub-graph from a huge network. The method and the system can be used in many applications, including database searching, the prediction of biological activity, the design of combinatorial syntheses, the interpretation of molecular spectra, and the analysis of social networks. One of the aspects of the invention is to screen out sub-graph candidates similar to a sample sub-graph by processing key nodes of the sample sub-graph, and identify any sub-graph similar to the sample sub-graph from the candidates.

Figure 2:
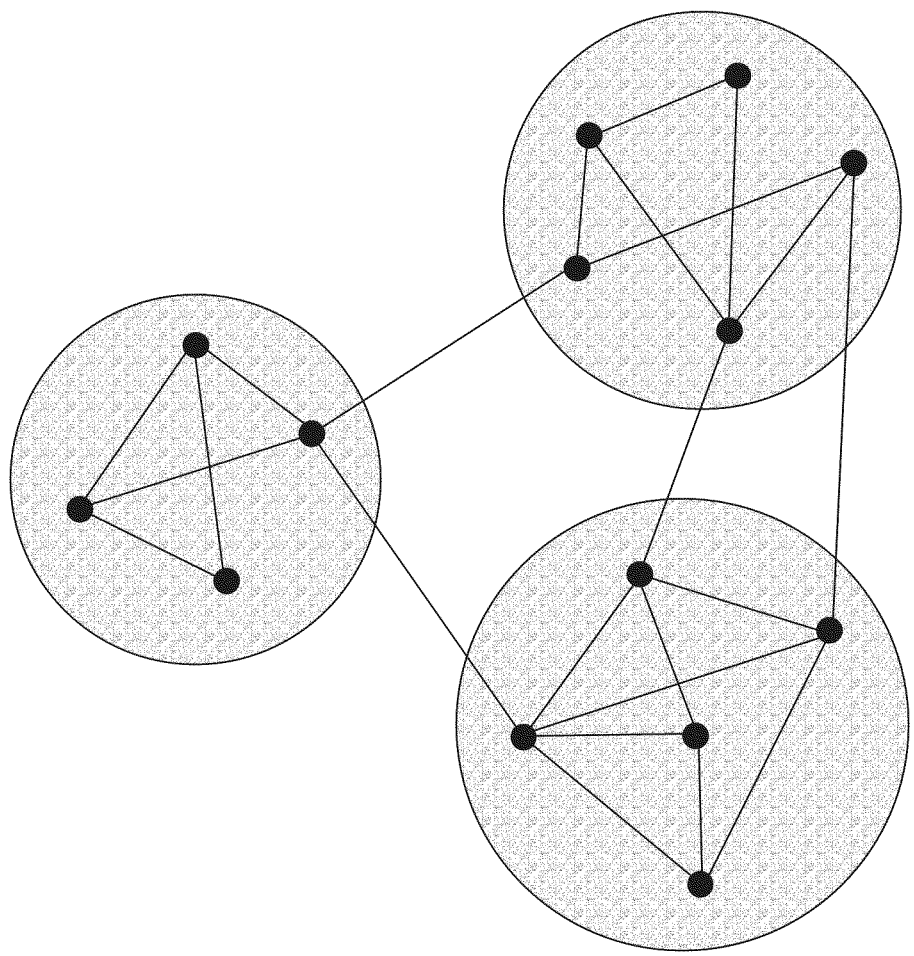
FIG. 2 shows a network, commonly found in prior art, including community structures.
Figure 3:
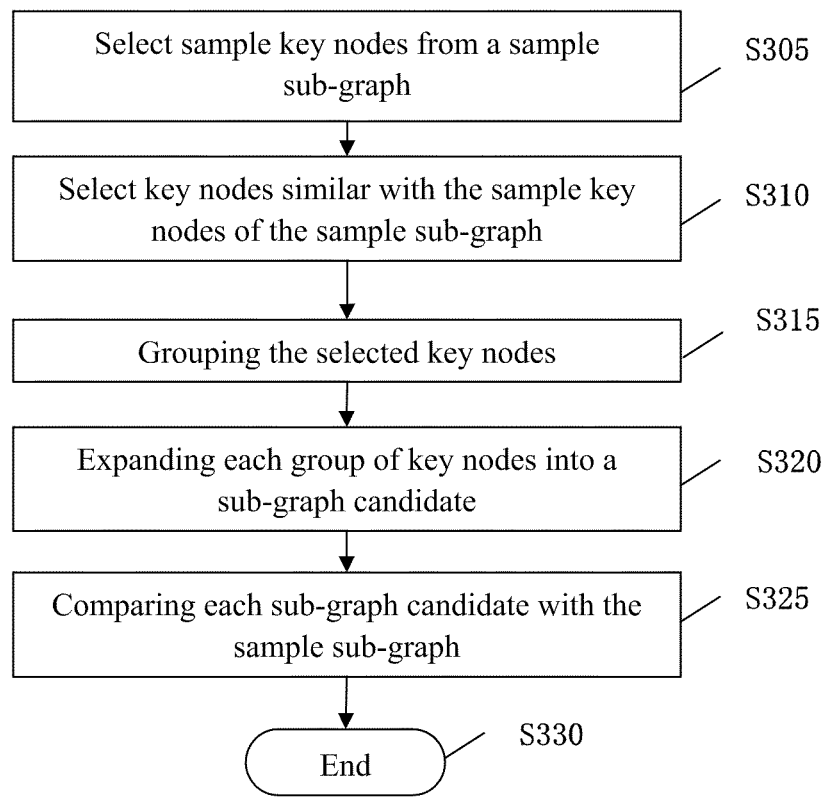
FIG. 3 shows an exemplary flowchart of the method for identifying similar sub-graphs in accordance with some of the embodiments of the invention.

FIG. 3 shows an exemplary flowchart of the method for identifying similar sub-graphs in accordance with some of the embodiments of the invention.

In step S305, sample key nodes of a sample sub-graph are identified. It shall be noted that the sample sub-graph could be internal to the network, or could be input externally, for example, be external to the network.

Figure 4:
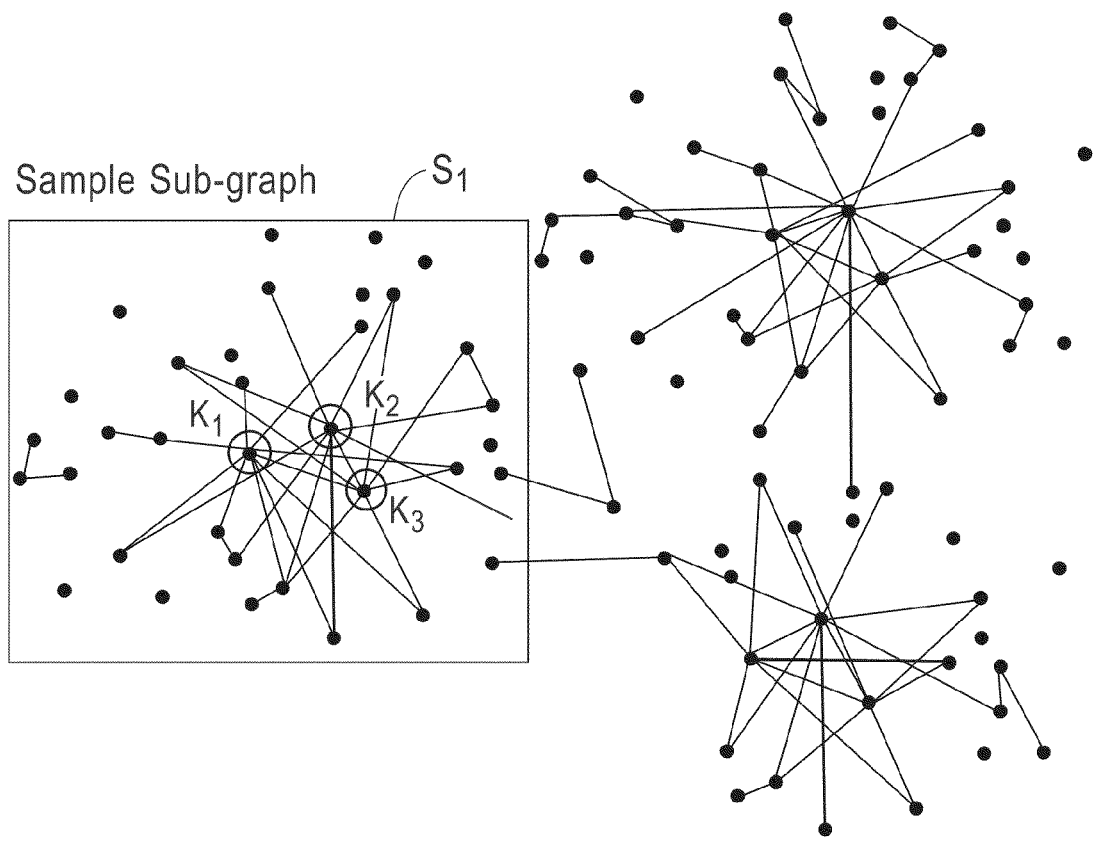
FIG. 4 shows the step S305 of the method shown in FIG. 3 in accordance with an embodiment of the invention.

FIG. 4 shows the step S305 of the method shown in FIG. 3 in accordance with an embodiment of the invention. On the left of FIG. 4, the sample sub-graph $S_1$ is shown, three sample key nodes $K_1$, $K_2$ and $K_3$ are identified in step S305.

Sub-graph consists of nodes and edges. Each node may have predetermined topology and/or semantic attributes, including but not limited to: degree centrality, betweenness centrality, closeness centrality, clustering coefficient, link data of graph, such as link analysis adopted by some searching engine, and so on. The above attributes are well known to those skilled in the art.

Specifically, degree centrality is typically defined as the number of links incident upon a node (i.e., the number of edges that a node has). If the network is directed, typically two separate measures of degree centrality are defined, namely indegree and outdegree. Indegree is a count of the number of edges directed to the node, and outdegree is the number of edges that the node directs to others. Degree centrality typically gives a description of how closely a node connects to other nodes.

Betweenness centrality is usually taken as a measure of the importance of a node in the graph. Nodes that occur on many shortest paths between other nodes have higher betweenness than those that do not. The betweenness centrality gives a good indication of the flow a node probably bears in a network. For example, in a communication network, the bigger the betweenness centrality of a node v is, the more the data packets flow through the node, which means the node is at bigger risk of congesting and will be a bottleneck of the network. In real networks, typically, only a small number of nodes have bigger betweenness centralities, which are referred as central nodes. Once the central nodes collapse, the whole network is in danger of collapse.

Let $\sigma_{st} = \sigma_{ts}$ denote the number of shortest paths from $s \in V$ to $t \in V$, where $\sigma_{ss} = 1$ by convention. Let $\sigma_{st}(v)$ denote the number of shortest paths from s to t that some $v \in V$ lies on. As found in prior art, the following are standard measures of betweenness centrality:

$$C_B(v) = \sum_{s \neq v \neq t \in V} \frac{\sigma_{st}(v)}{\sigma_{st}}$$

wherein V is the set of nodes in the graph.

Closeness centrality is another basic concept in the field of graph. It is another centrality measure of a node in a graph. For example, it is defined as the mean geodesic distance (i.e. the shortest path) between a node v and all other nodes reachable from it. Typically $d_G(s,t)$ is used to denote the distance between nodes s and t, i.e., the minimum length of any path connecting s and t in G. By definition, $d_G(s,s)=0$ for every $s \in V$, and $d_G(s,t)=d_G(t,s)$ for s, $t \in V$. As found in prior art, the closeness centrality is represented as:

$$C_C(v) = \frac{1}{\sum_{t \in V} d_G(v, t)}$$

Link analysis is a subset of network analysis, exploring associations between objects. An example may be examining the addresses of suspects and victims, the telephone numbers they have dialed and financial transactions that they have partaken in during a given timeframe, and the familial relationships between these subjects as a part of police investigation. Link analysis here provides the crucial relationships and associations between very many objects of different types that are not apparent from isolated pieces of information. Computer-assisted or fully automatic computer-based link analysis is increasingly employed by banks and insurance agencies in fraud detection, by telecommunication operators in telecommunication network analysis, by medical sector in epidemiology and pharmacology, in law enforcement investigations, by search engines for relevance rating, and everywhere else where relationships between many objects have to be analyzed. Several Web search ranking algorithms use link-based centrality metrics, including Marchiori's Hyper Search, Google's PageRank, Kleinberg's HITS algorithm, and the TrustRank algorithm. Link analysis is also conducted in information science and communication science in order to understand and extract information from the structure of collections of web pages. For example the analysis might be of the interlinking between politicians' web sites or blogs.

As the above attributes can be calculated and quantified, it is possible to select key nodes from a sample sub-graph by adopting predetermined criteria (e.g., predetermined thresholds) based on the requirements of various applications. For example, when a graph represents a communication network, it may select a node having a betweenness centrality higher than a certain threshold as a key node; when a graph represents a social network consisting of email accounts, it may select a node having a degree centrality higher than a certain threshold as a key node; when a graph represents the links between web pages, it may select a node having a link analysis within a certain value range as a key node.

Moreover, the above attributes of nodes are illustrative only. Those skilled in the art may adopt other attributes to select key nodes from a sample sub-graph. Moreover, the above attribute can be used individually or in combination.

In Step S310, key nodes similar to the sample key nodes are selected from the network graph.

Figure 5:
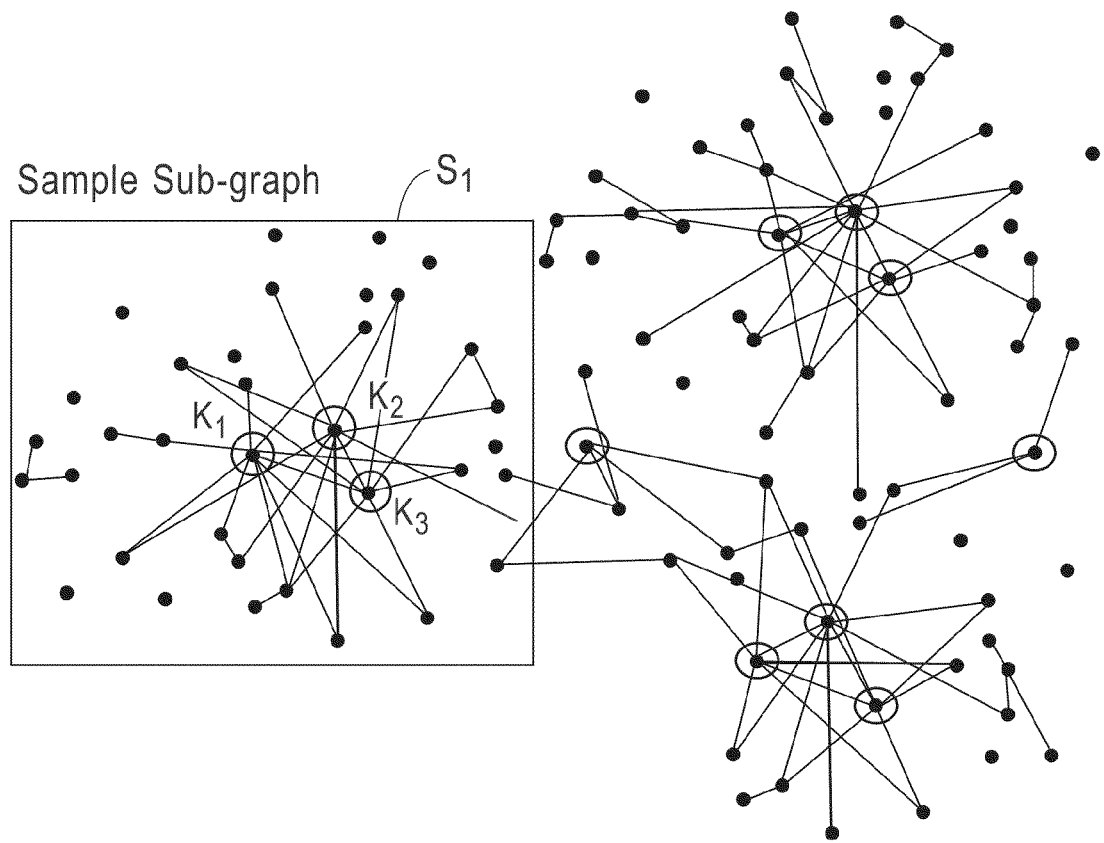
FIG. 5 shows the step S310 of the method shown in FIG. 3 in accordance with an embodiment of the invention.

FIG. 5 shows the processing of step S310 in accordance with the embodiment of the invention. On the right of FIG. 5, the key nodes selected by step S310 are shown (being circled), which are similar to the sample key nodes $K_1$, $K_2$ and $K_3$ on the left of FIG. 5.

Preferably, the criteria adopted by step S310 are identical with that of step S305. In this way, the key nodes selected from the network graph have same or similar attributes as that of the sample key nodes. The details are omitted here. Alternatively, in step S310, the attributes of the sample key nodes outputted by step S305 are analyzed, and then nodes having same or similar attributes as those of the sample key nodes are directly selected from the network graph.

In step S315, the selected similar key nodes are grouped.

Preferably, key nodes forming a graph similar to the graph formed by the sample key nodes are taken as one group.

Figure 6:
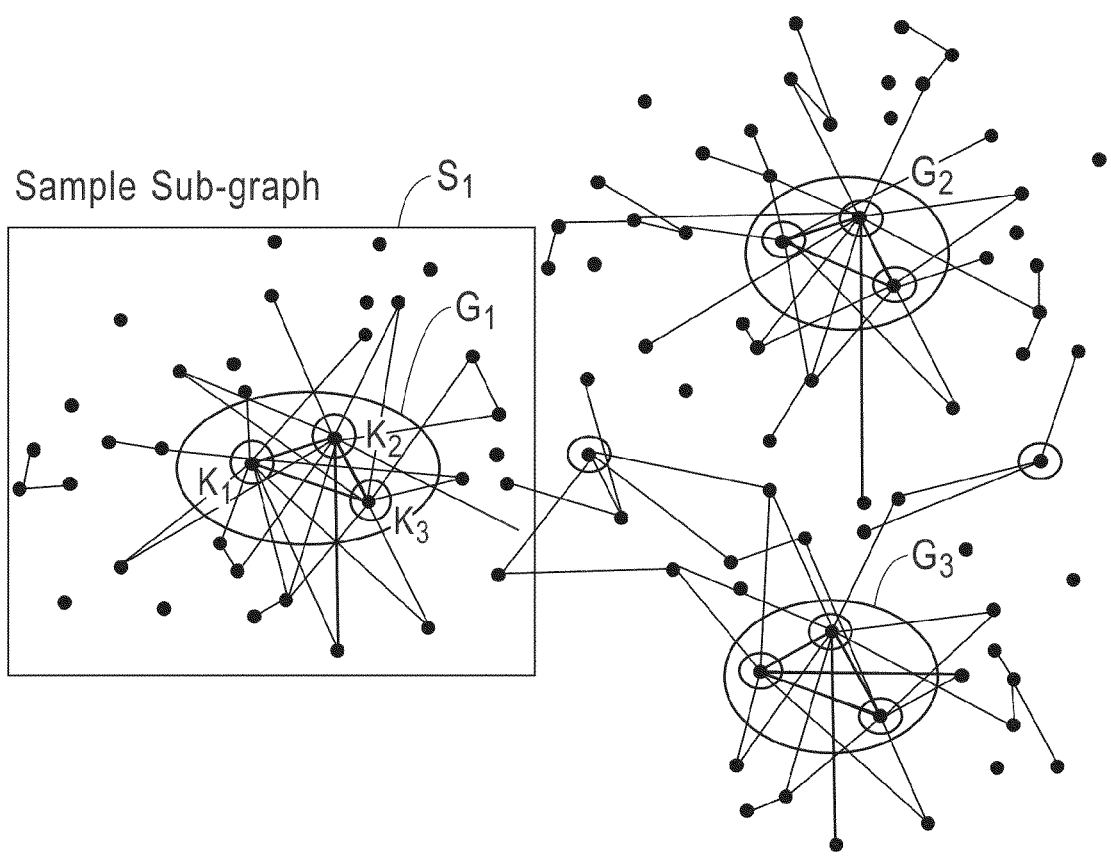
FIG. 6 shows the step S315 of the method shown in FIG. 3 in accordance with an embodiment of the invention.

FIG. 6 shows the processing of step S315 in accordance with the embodiment of the invention. Intuitively, the three key nodes $K_1$, $K_2$ and $K_3$ form a sub-graph $G_1$ (as shown in the circle on the left of FIG. 6), which is a triangle. From the key nodes selected by step S310, any key nodes that could form a graph similar with the graph formed by the sample key nodes $K_1$, $K_2$ and $K_3$ are taken as a group. On the right of FIG. 6, it shows two groups (as shown in the circles on the right of FIG. 6), each group of key nodes forms a triangle sub-graph respectively, $G_2$ and $G_3$. The triangle sub-graph $G_2$ and $G_3$ are similar to the sub-graph $G_1$.

Step S315 only processes the key nodes outputted by step S310, that is, to compare the sample key nodes of a sample sub-graph with the key nodes of the whole network. For example, the key nodes (other than those of the sample sub-graph) are divided into a number of groups, where the topology of each group of key nodes is similar with that of sample key nodes. Even in a huge and complex network, there not so many key nodes of most importance, thus the calculation complexity of step S315 is reasonable. Preferably, in this embodiment, three sample key nodes $K_1$, $K_2$ and $K_3$ form a graph $G_1$, and there is a need to search groups of key nodes that are similar with $G_1$.

Various methods found in prior art are used to implement the step S315. For example, Pattern Recognition Letters, 2001, by Fernandez and Valiente, introduces how to identify a maximum common sub-graph, i.e., how to identify the maximum isomorphic sub-graphs between two graphs. The isomorphism is a common technical term in this field, the details of it are omitted here. Moreover, Graph Similarity and Matching, Master's thesis, EECS, MIT, 2005, by Laura Zaget, also introduces how to identify the potential isomorphism between graphs. The contents of the above papers are incorporated entirely herein by reference.

It shall be noted that isomorphism describes the exact matching between graphs. However, it is possible to set a different standard so as to identify group of key nodes that has a predetermined similarity.

In addition, step S315 is not limited to the above specific methods. Those skilled in the art may implement S315 by many other methods, as long as a group of key nodes that is similar with $G_1$ formed by three sample key nodes $K_1$, $K_2$ and $K_3$ can be identified.

In step S320, each group of key nodes outputted by step S315 is expanded to a sub-graph candidate.

Figure 7:
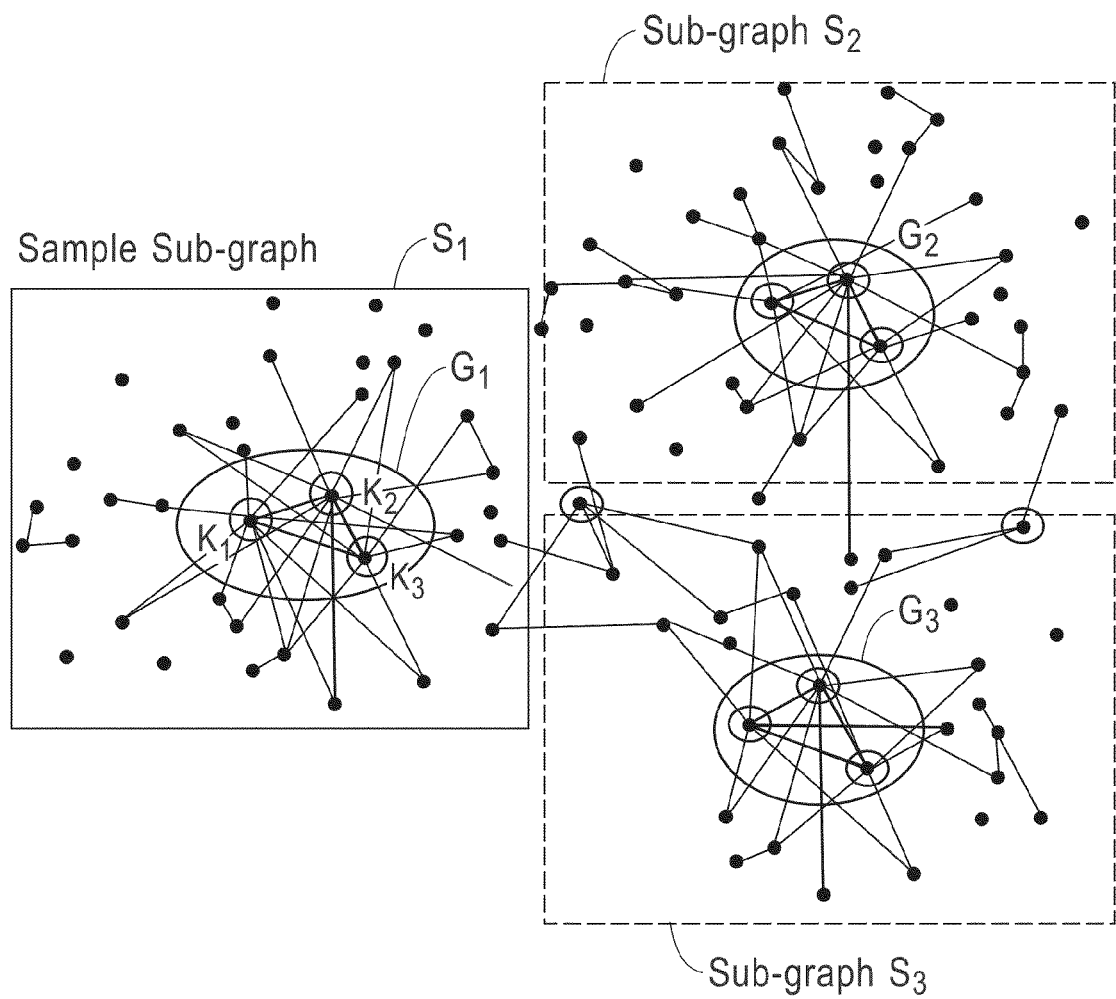
FIG. 7 shows the step S320 of the method shown in FIG. 3 in accordance with an embodiment of the invention.

FIG. 7 shows the processing of step S320 in accordance with an embodiment of the invention. On the left of FIG. 7, it shows the sample sub-graph $S_1$. On the right of FIG. 7, it shows the expanded sub-graph candidates $S_2$ and $S_3$ (as shown in the dotted rectangular).

Preferably, each group of key nodes is expanded to a sub-graph candidate step by step. For example, by one-step expanding, the group is expanded from each key node thereof to any directly adjacent nodes. Alternatively, by n-step expanding, n>1, the group is expanded from each key node thereof to all the adjacent nodes that are n steps away. In this embodiment, it is expanded from the key nodes step by step, until the expanded sub-graph is comparable with the sample sub-graph $S_1$, as shown in FIG. 7. The parameter n may be preset by those skilled in the art.

Alternatively, parameter n is not preset. Instead, the expanded sub-graph is compared with the sample sub-graph after each step-expanding, until it meets the requirements. For example, key nodes are taken as seed nodes, and all the nodes directly adjacent to the seed nodes are added into the group so that the group of key nodes is expanded, repeat the above processing until for example the total number of the nodes of the sub-graph reaches a given value. In this way, the sub-graph candidates are generated.

Alternatively, at least one group of key nodes from step S315 is expanded into a sub-graph candidate, rather than expanding every group of key nodes.

In step 325, a strict comparison between each sub-graph candidates ($S_2$ and $S_3$) and the sample sub-graph ($S_1$) is made, so as to find sub-graphs similar (even identical) with the sample sub-graph ($S_1$). In this embodiment, as shown in FIG. 7, both sub-graph candidates ($S_2$ and $S_3$) are similar (not identical) with the sample sub-graph ($S_1$).

Step S325 could be implemented by various methods including the ones introduced in the background. The methods should be obvious to one skilled in the art.

It shall be noted that, by the prescreening of steps S305-S320, step S325 only compares sub-graph candidates $S_2$ and $S_3$ (instead of the whole network) with the sample sub-graph $S_1$.

After step S325, it proceeds to the end S330 of the method.

It shall be noted that, the embodiment of FIGS. 4-7 is only illustrative. In particular, for the sake of simplicity, the network of FIGS. 4-7 is relatively simple. In real applications, network could be huge and complex, containing many community structures, while a sample sub-graph and sub-graph candidate is only a small part of the whole network. In such situation, the invention is capable of greatly reducing the calculation complexity, and thus has significant values in real applications.

Figure 8:
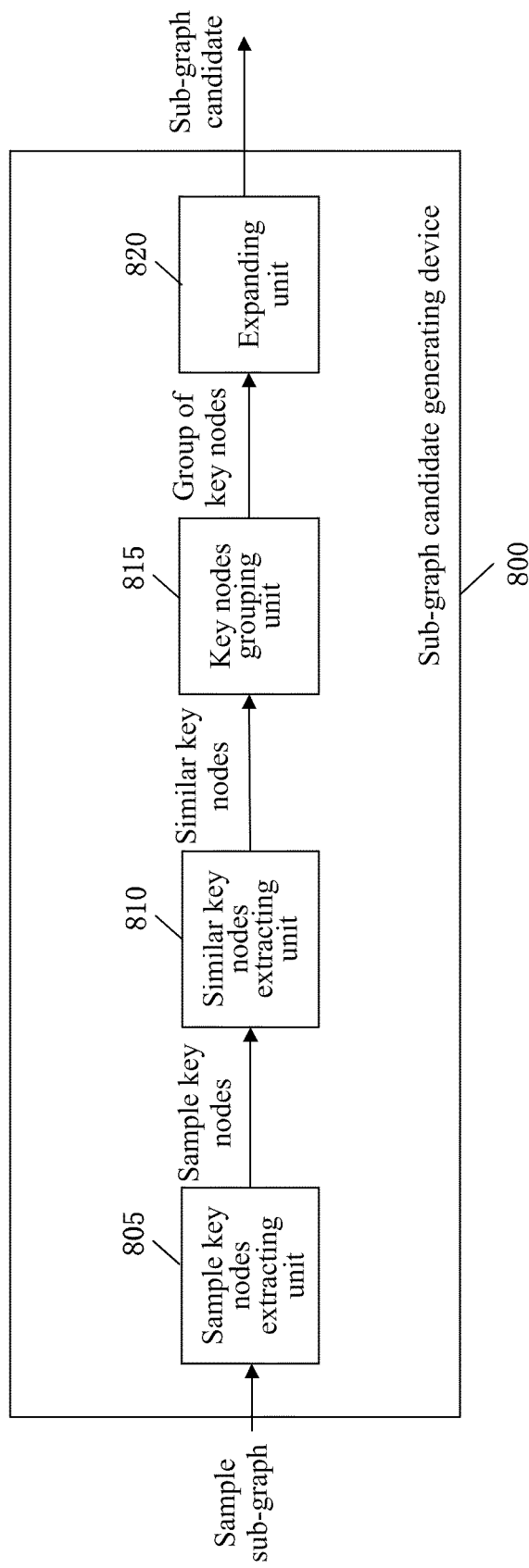
FIG. 8 shows an exemplary structure of the device in accordance with some of the embodiments of the invention.

FIG. 8 shows an exemplary structure of the device in accordance with some of the embodiments of the invention. Apparatus and device are words used interchangeably in this document.

The sub-graph candidate generating device 800 of FIG. 8 is used for generating sub-graph candidates to be compared with a sample sub-graph.

The sub-graph candidate generating device 800 includes: a sample key node extracting unit 805, a similar key node extracting unit 810, a key node grouping unit 815 and an expanding unit 820.

The sample key node extracting unit 805 receives a sample sub-graph, and extracts one or more sample key nodes from it, as shown in step S305 of FIG. 3.

The similar key node extracting unit 810 receives the sample key nodes output from the sample key node extracting unit 805, and extracts similar key nodes from the whole network. Preferably, the criteria adopted by the similar key node extracting unit 810 are identical with that of the sample key node extracting unit 805, as shown in step S310 of FIG. 3.

Alternatively, the similar key node extracting unit 810 analyzes the attributes of the received sample key nodes, and then selects nodes having same or similar attributes as those of the sample key nodes from the network graph.

The key node grouping unit 815 receives the similar key nodes output from the similar key node extracting unit 810, and groups them in such a way that each group of key nodes form a graph similar or identical with the graph formed by the sample key nodes, as shown in step S315 of FIG. 3.

The expanding unit 820 receives the groups of key nodes output from the key node grouping unit 815, and expand each group into a sub-graph candidate, as shown in step S320 of FIG. 3. Thus, the sub-graph candidate generating device 800 generates the candidates to be compared with the sample sub-graph.

The sub-graph candidate generating device 800 may output the resulted candidates to a subsequent comparing device (not shown). The comparing device may compare the candidates with the sample to identify any sub-graph that is similar or identical with the sample.

It shall also be noted that the sub-graph candidate generating device 800 could be integrated with the comparing device as one single device, or separately implemented as different devices.

Figure 9:
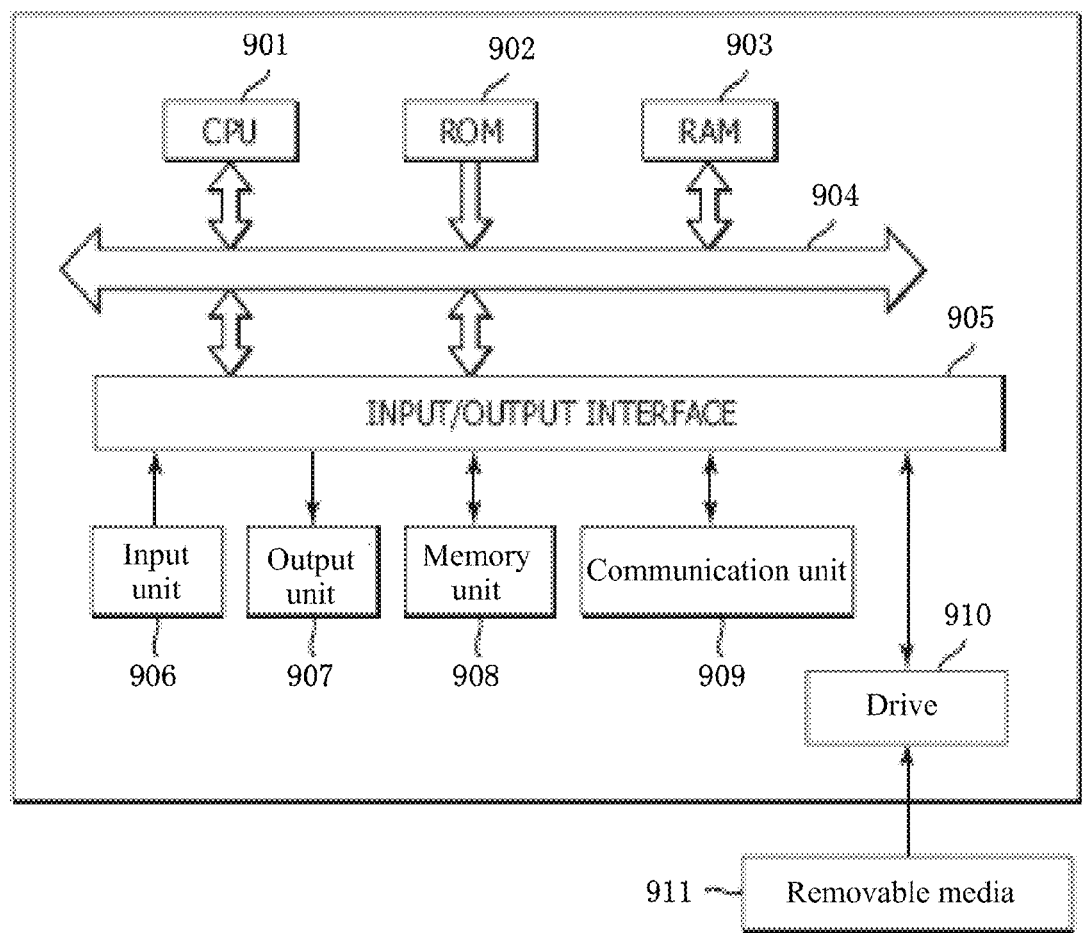
FIG. 9 shows a block diagram showing an exemplary structure of hardware of a personal computer capable of performing processing steps as in FIG. 3.

FIG. 9 shows a block diagram showing an example of a structure of hardware of a personal computer which performs the series of processing as described above.

In the computer, CPU (Central Processing Unit) 901, ROM (Read Only Memory) 902, and RAM (Random Access Memory) 903 are mutually connected by a bus 904.

An input/output interface 905 is further connected to the bus 904. The input/output interface 905 is connected to an input unit 906 constituted by a keyboard, a mouse, a microphone, and the like, an output unit 907 constituted by a display, a speaker, and the like, a memory unit 908 constituted by a hard disk, a non-volatile memory, and the like, a communications unit 909 constituted by a network interface, or the like, and a drive 910 for driving removable media 911, such as a magnetic disk, an optical disc, a magneto-optical disc, or a semiconductor memory, and the like.

In the thus configured computer, CPU 901 loads the program stored in the memory unit 908 to RAM 903, via the input/output interface 905 and the bus 904, for execution of programs.

The programs to be executed by the computer (CPU 901) is recorded on the removable media 911 which are package media constituted by a magnetic disk (including flexible disk), optical discs (CD-ROM (Compact Disc-Read Only Memory), DVD (Digital Versatile Disc), etc.), a magneto-optical disc, a semiconductor memory, or is provided through wired or wireless transmission media, such as a local area network, the internet, and digital satellite broadcasting.

Further, by mounting the removable media 911 to the drive 910, the program can be installed in the memory unit 908 via the input/output interface 905. Furthermore, the program can be received at the communications unit 909 through the wired or wireless transmission media, and can be installed in the memory unit 908. In addition, the program can be preinstalled in ROM 902 or the memory unit 908.

An advantage of some of the embodiments of the invention is capability of pre-screening the network via key nodes of a sample sub-graph, and then making comparison from the results of pre-screening. In this way, the scale of network graphs to be compared is greatly reduced, thus the performance of the method is increased.

It should be noted that the program to be executed by the computer may be a program with which the processing is performed along the order of the description in the present specification, and may be a program with which the processing is performed at a timing when the processing is required, such as when it is called.

Further, in the present specification, "system" represents the whole apparatus constituted by a plurality of apparatuses.

It should be noted that embodiments of the present invention are not limited to the embodiments described above, and various modifications are allowed without departing from the gist of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. A method of identifying a sub-graph in a network by comparing the sub-graph with a sample sub-graph, the method comprising:
   identifying, from the sample sub-graph, at least one sample key node, the sample key node topology relationships, and the sample key node semantic attributes;
   selecting at least one key node similar to the at least one sample key node based on the topology relationships and semantic attributes, wherein the network includes the at least one key node;
   forming at least one group, wherein the key nodes in each formed group have similar topology relationships and semantic attributes as the key nodes in the sample sub-graph;
   expanding at least one formed group into a corresponding sub-graph candidate, wherein the expanding adds at least one node to each formed group to produce each corresponding sub-graph candidate; and
   comparing each sub-graph candidate with the sample sub-graph;
   wherein at least one of the steps is carried out using a computer device.

2. The method of claim 1, wherein the identifying comprises:
   identifying the at least one sample key node having at least one predetermined attribute, wherein the sample sub-graph is one of a set of sub-graphs internal to the network or external to the network, and wherein the sub-graph includes the at least one sample key node.

3. The method of claim 2, wherein the at least one predetermined attribute comprises one of a degree centrality, a betweenness centrality, a closeness centrality and a link analysis.

4. The method of claim 2, wherein the selecting comprises:
   selecting the at least one key node having at least one attribute similar to the at least one predetermined attribute.

5. The method of claim 1, wherein the forming comprises:
   grouping the selected at least one key node to form the at least one group.

6. The method of claim 1, wherein the expanding comprises:
   expanding the at least one group into the corresponding sub-graph candidate by step-expanding.

7. The method of claim 1, wherein the sample sub-graph is a community.

8. An apparatus for identifying a sub-graph in a network by comparing the sub-graph with a sample sub-graph, the apparatus comprising:
   a sample key node extracting unit adapted to extract from the sample sub-graph at least one sample key node, the sample key node topology relationships, and the sample key node semantic attributes;
   a key node extracting unit adapted to extract at least one key node similar to the at least one sample key node based on the topology relationships and semantic attributes, wherein the network includes the at least one key node;
   a key node grouping unit adapted to form at least one group, wherein the key nodes in each formed group have similar topology relationships and semantic attributes as the key nodes in the sample sub-graph;
   an expanding unit adapted to expand at least one formed group into a corresponding sub-graph candidate, wherein the expanding adds at least one node to each formed group to produce each corresponding sub-graph candidate; and
   a comparing unit adapted to compare each sub-graph candidate with the sample sub-graph;
   wherein at least one of the units is part of a computer device having a memory and a processor.

9. The apparatus of claim 8, wherein the sample key node extracting unit is adapted to identify the at least one sample key node having at least one predetermined attribute, wherein the sample sub-graph is one of a set of sub-graphs internal to the network or external to the network, and wherein the sample sub-graph includes the at least one sample key node.

10. The apparatus of claim 9, wherein the at least one predetermined attribute comprises one of a degree centrality, a betweenness centrality, a closeness centrality and a link analysis.

11. The apparatus of claim 9, wherein the key node extracting unit is adapted to select the at least one key node having at least one attribute similar to the at least one predetermined attribute.

12. The apparatus of claim 8, wherein the key node grouping unit is adapted to group the selected at least one key node to form the at least one group.

13. The apparatus of claim 8, wherein the expanding unit is adapted to expand the at least one group into the sub-graph candidate by step-expanding.

14. The apparatus of claim 8, wherein the sample sub-graph is a community.

15. A method of identifying a sub-graph candidate in a network by comparing the sub-graph potentially with a sample sub-graph, the method comprising:
   identifying, from the sample sub-graph, at least one sample key node, the sample key node topology relationships, and the sample key node semantic attributes;
   selecting at least one key node similar to the at least one sample key node based on the topology relationships and semantic attributes, wherein the network includes the at least one key node;
   forming at least one group, wherein the key nodes in each formed group have similar topology relationships and semantic attributes as the key nodes in the sample sub-graph; and
   expanding at least one formed group into a corresponding sub-graph candidate, wherein the expanding adds at least one node to each formed group to produce each corresponding sub-graph candidate;
   wherein at least one of the steps is carried out using a computer device.

16. The method of claim 15, wherein the identifying comprises:
   identifying the at least one sample key node having at least one predetermined attribute, wherein the sample sub-graph is one of a set of sub-graphs internal to the network or external to the network, and wherein the sample sub-graph includes the at least one sample key node.

17. The method of claim 16, wherein the at least one predetermined attribute comprises one of a degree centrality, a betweenness centrality, a closeness centrality and a link analysis.

18. The method of claim 16, wherein the selecting comprises:
   selecting the at least one key mode having at least one attribute similar to the at least one predetermined attribute.

19. The method of claim 15, wherein the forming comprises:
 grouping the selected at least one key node to form the at least one group.

20. The method of claim 15, wherein the expanding comprises:
 expanding the at least one group into the corresponding sub-graph candidate by step-expanding.

\* \* \* \* \*